US012632495B2

(12) United States Patent (10) Patent No.: US 12,632,495 B2

McCarson (45) Date of Patent: May 19, 2026

(54) SYSTEMS AND METHODS FOR DERIVING LEADING INDICATORS OF ECONOMIC ACTIVITY USING PREDICTIVE ANALYTICS APPLIED TO PEDESTRIAN ATTRIBUTES TO PREDICT BEHAVIORS AND INFLUENCE BUSINESS OUTCOMES

(71) Applicant: Brian McCarson, Chandler, AZ (US)

(72) Inventor: Brian McCarson, Chandler, AZ (US)

( * ) Notice: Subject to any disclaimer, the term of this patent is extended or adjusted under 35 U.S.C. 154(b) by 788 days.

(21) Appl. No.: 18/157,981

(22) Filed: Jan. 23, 2023

(65) Prior Publication Data

US 2023/0161814 A1     May 25, 2023

Related U.S. Application Data

(63) Continuation-in-part of application No. 17/840,390, filed on Jun. 14, 2022, now abandoned, which is a (Continued)

(51) Int. Cl.
    *G08G 3/00*        (2006.01)
    *G06F 16/587*      (2019.01)
    (Continued)

(52) U.S. Cl.
    CPC .......... *G06F 16/587* (2019.01); *G06F 16/907* (2019.01); *G06F 18/2133* (2023.01);
    (Continued)

(58) Field of Classification Search
    CPC .. G06F 16/587; G06F 16/907; G06F 18/2133; G06F 18/24155; G06F 18/29; G06N 3/02;

G06N 3/04; G06N 3/042; G06N 3/045; G06N 3/08; G06N 5/01; G06N 5/02; G06N 5/022; G06N 5/025; G06N 5/04; G06N 7/01; G06N 20/00; G06N 20/10; G06N 20/20; G06Q 30/0202; G06V 10/765; G06V 10/84; G06V 20/13; G06V 20/188; G06V 20/52; G08G 1/0133; G08G 3/00; G08G 5/20; G08G 1/0116

See application file for complete search history.

(56) References Cited

U.S. PATENT DOCUMENTS 8,379,913 B1    2/2013  Robinson et al.
11,361,202 B2   6/2022  McCarson
(Continued)

OTHER PUBLICATIONS

Atkinson-Abutridy, John, Chris Mellish, and Stuart Aitken. "A semantically guided and domain-independent evolutionary model for knowledge discovery from texts." IEEE Transactions on Evolutionary Computation 7.6 (2004): 546-560. (Year: 2004).

(Continued)

*Primary Examiner* — Shane D Woolwine

(74) *Attorney, Agent, or Firm* — Daniel R. Pote

(57)     ABSTRACT

Predictive analytics techniques are provided for produce leading indicators of economic activity based on observed pedestrian attributes—e.g., appearance and behavior—and other factors determined from a range of available data sources. A consistent, semantic metadata structure is described as well as a hypothesis generating and testing system capable of generating predictive analytics models in a non-supervised or partially supervised mode.

20 Claims, 11 Drawing Sheets

Related U.S. Application Data continuation of application No. 16/797,640, filed on Feb. 21, 2020, now Pat. No. 11,361,202.

(51) Int. Cl.

| | |
|---|---|
| *G06F 16/907* | (2019.01) |
| *G06F 18/20* | (2023.01) |
| *G06F 18/2133* | (2023.01) |
| *G06F 18/2415* | (2023.01) |
| *G06N 3/045* | (2023.01) |
| *G06N 3/08* | (2023.01) |
| *G06N 5/01* | (2023.01) |
| *G06N 7/01* | (2023.01) |
| *G06N 20/10* | (2019.01) |
| *G06N 20/20* | (2019.01) |
| *G06Q 30/0202* | (2023.01) |
| *G06V 10/764* | (2022.01) |
| *G06V 10/84* | (2022.01) |
| *G06V 20/10* | (2022.01) |
| *G06V 20/13* | (2022.01) |
| *G06V 20/52* | (2022.01) |
| *G08G 1/01* | (2006.01) |
| *G08G 5/20* | (2025.01) |
| *G06N 20/00* | (2019.01) |

(52) U.S. Cl.

CPC ........ *G06F 18/24155* (2023.01); *G06F 18/29* (2023.01); *G06N 3/045* (2023.01); *G06N 3/08* (2013.01); *G06N 5/01* (2023.01); *G06N 7/01* (2023.01); *G06N 20/10* (2019.01); *G06N 20/20* (2019.01); *G06Q 30/0202* (2013.01); *G06V 10/764* (2022.01); *G06V 10/84* (2022.01); *G06V 20/13* (2022.01); *G06V 20/188* (2022.01); *G06V 20/52* (2022.01); *G08G 1/0133* (2013.01); *G08G 3/00* (2013.01); *G08G 5/20* (2025.01); *G06N 20/00* (2019.01); *G08G 1/0116* (2013.01)

(56) References Cited

U.S. PATENT DOCUMENTS

| | | | | |
|---|---|---|---|---|
| 12,086,178 | B2 | 9/2024 | McCarson | |
| 12,088,599 | B1 | 9/2024 | McCarson | |
| 12,450,284 | B2 | 10/2025 | McCarson | |
| 2008/0162182 | A1 | 7/2008 | Cazares et al. | |
| 2013/0024125 | A1 | 1/2013 | Lystig et al. | |
| 2013/0051621 | A1 | 2/2013 | Robinson | |
| 2017/0041874 | A1 | 2/2017 | Jarosinski | |
| 2018/0198831 | A1 | 7/2018 | Calcaterra | |
| 2019/0147305 | A1 | 5/2019 | Lu | |
| 2019/0250839 | A1* | 8/2019 | Bedadala | G06F 3/0653 |
| 2019/0332863 | A1 | 10/2019 | Abhishek | |
| 2019/0391578 | A1* | 12/2019 | Tariq | G05D 1/0246 |
| 2020/0156632 | A1* | 5/2020 | Ding | G06N 3/0464 |
| 2021/0264225 | A1 | 8/2021 | McCarson | |
| 2022/0318577 | A1 | 10/2022 | McCarson | |
| 2023/0289381 | A1 | 9/2023 | McCarson | |
| 2023/0342392 | A1 | 10/2023 | McCarson | |
| 2024/0256598 | A1 | 8/2024 | McCarson | |
| 2024/0265047 | A1 | 8/2024 | McCarson | |
| 2024/0346342 | A1 | 10/2024 | Lewis et al. | |
| 2024/0419706 | A1 | 12/2024 | Gutierrez | |
| 2025/0061377 | A1 | 2/2025 | Ngo | |
| 2025/0190460 | A1 | 6/2025 | Madisetti et al. | |
| 2025/0200108 | A1 | 6/2025 | McCarson | |
| 2025/0200208 | A1 | 6/2025 | Roper, Jr. et al. | |
| 2025/0244964 | A1 | 7/2025 | Mystetskyi et al. | |
| 2025/0258774 | A1 | 8/2025 | Sun | |
| 2025/0259043 | A1 | 8/2025 | Crabtree et al. | |
| 2025/0278526 | A1 | 9/2025 | Roper, Jr. et al. | |
| 2025/0371074 | A1 | 12/2025 | McCarson | |
| 2026/0037573 | A1 | 2/2026 | McCarson | |

OTHER PUBLICATIONS

Bazgir, Adib, and Yuwen Zhang. "Agentichypothesis: A survey on hypothesis generation using llm systems." Towards Agentic AI for Science: Hypothesis Generation, Comprehension, Quantification, and Validation (Mar. 2025). (Year: 2025).

Huang, Lifu, et al. "Towards Agentic AI for Science: Hypothesis Generation, Comprehension, Quantification, and Validation." Companion Proceedings of the ACM on Web Conference May 2025. (Year: 2025).

Maragheh, Reza Yousefi, and Yashar Deldjoo. "The Future is Agentic: Definitions, Perspectives, and Open Challenges of Multi-Agent Recommender Systems." arXiv preprint arXiv:2507.02097 v2 (Jul. 2025). (Year: 2025).

Mondal, Rajdeep, et al. "Multi-agent AI System for High Quality Metadata Curation at Scale." bioRxiv (Jun. 2025): Jun. 2025. (Year: 2025).

Queralt-Rosinach, NA°ria, et al. "Structured reviews for data and knowledge-driven research." Database 2020 (2020): baaa015. (Year: 2020).

Silva, Kelson, et al. "Arch Hypo: managing software architecture uncertainty using hypotheses engineering." IEEE Transactions on Software Engineering (2024). (Year: 2024).

Singh, Hardial. "How Generative AI is Revolutionizing Scientific Research by Automating Hypothesis Generation." Available at SSRN 5267912 (Jul. 2025). (Year: 2025).

Search Report and Written Opinion of the ISA, Issued Aug. 29, 2024 in PCT/US2024/035527.

Lopez-Lozano et al. ("An evaluation framework to build a cost-efficient crop monitoring system. Experiences from the extension of the European crop monitoring system," Agricultural Systems 168, 302, pp. 231-246) (Year: 2019) entire document.

Radford et al. ("Language Models are Unsupervised Multitask Learners", OpenAI blog, 1(8), 2019, pp. 1-24) (Year: 2019) entire document.

Cong et al. ("Alternative Data for FinTech and Business Intelligence", Available at SSRN: https://ssrn.com/abstract=3521349 or http://dx.doi.org/10.2139/ssrn.3521349, Oct. 1, 2019, p. 1-31) (Year: 2019) entire document.

Ayush et al. ("Generating Interpretable Poverty Maps using Object Detection in Satellite Images", https://arxiv.org/pdf/2002.01612v1 .pdf, arXiv:2002.01612v1 [cs.CV], Feb. 5, 2020, pp. 1-9) (Year: 2020).

Kolanovic et al. ("Big Data and AI Strategies: Machine Learning and Alternative Data Approach to Investing", J.P. Morgan, Global Quantitative and Derivatives Strategy, May 18, 2017, pp. 1-280) (Year. 2017).

Nakajima et al. ("Bayesian Analysis of Latent Threshold Dynamic Models", 2011 Seminar on Bayesian Inference in Econometrics and Statistic (SBIES), 2011, pp. 1-36) (Year: 2011).

Blazquez et al. ("Big Data sources and methods for social and economic analyses", Technological Forecasting and Social Change 130, 2018, pp. 99-113) (Year 2016).

Li et al. ("Estimation of regional economic development indicator from transportation network analytics", Scientific reports, 10(1), Feb. 1, 20204, pp. 1-15) (Year: 2020).

Fedorov et al. ("Traffic flow estimation with data from a video surveillance camera", Journal Big Data, 6:73, 2019, pp. 1-15) (Year: 2019).

Joseph et al. ("A novel vessel detection and classification algorithm using deep learning neural network model with morphological processing (M-DLNN)", Soft Computing 23, 2019, pp. 2693-2700) (Year: 2019).

Arslanalp et al. ("Big Data on Vessel Traffic: Nowcasting Trade Flows in Real Time: IMF Working Paper", WP/19/275, Dec. 13, 2019, pp. 1-34) (Year: 2019).

(56) References Cited

OTHER PUBLICATIONS

Saraj et al. ("On monitoring development indicators using high resolution satellite images", https://arxiv.org/abs/1712.022822,arXiv: 1712.02282v3 [econ.EM] Jun. 25, 2018, pp. 1-36) (Year: 2018).

Dandala et al. ("Internet of Vehicles (Iov) for Traffic Management", IEEE International Conference on Computer, Communication and Signal Processing (ICCCSP-2017), 2017, pp. 1-4) (Year: 2017).

Hu et al. ("Improved monitoring of urbanization processes in China for regional climate impact assessment", Environ Earth Sci 73, pp. 8387-8404, 2015) (Year: 2015).

* cited by examiner

701 Receive data from a plurality of data sources

702 Perform data cleansing and pre-processing

703 Perform predictive analytics on individual data streams

704 Build/refine algorithms on individual data streams

705 Assign metadata to pre-processed data

706 Aggregate data sets

707 Refine algorithms on aggregated data

708 Publish leading indicators

700

Hypothesis Generating
and Testing System
800

Observed Pedestrian attributes
- Clothing (brands, style, etc.)
- Carried objects (e.g., branded coffee cups, totes, bags, etc.)
- Gait (speed, stride, etc.)
- Size (height, weight)
- Posture
- Grouping/clustering
- . . .

1100

1102 (Pedestrians)

Pedestrian 15080 Metadata Attributes:
Minutes In Store Per Visit: 0
In Store Visits Per Year:
Outside Store Detections Per Year: 14.0
Purchase Per Visit: 0
Purchase Method: n/a
Online Purchase History: none
Association: none

...

Pedestrian 12001 Metadata Attributes:
Minutes In Store Per Visit: 12.1
In Store Visits Per Year: 9.7
Outside Store Detections Per Year: 9.7
Purchase Per Visit: $23.70
Purchase Method: Visa xxxx-xxxx-xxxx-5134
Online Purchase History: none
Association: Pedestrian 14321

...

Pedestrian 14321 Metadata Attributes:
Minutes In Store Per Visit: 10.9
In Store Visits Per Year: 4.2
Outside Store Detections Per Year: 12.8
Purchase Per Visit: $35.75
Purchase Method: Cash, MC xxxx-xxxx-xxxx-6700
Online Purchase History: 6.2 purchases per year at $46.90 per purchase
Association: Pedestrian 12001

...

1200

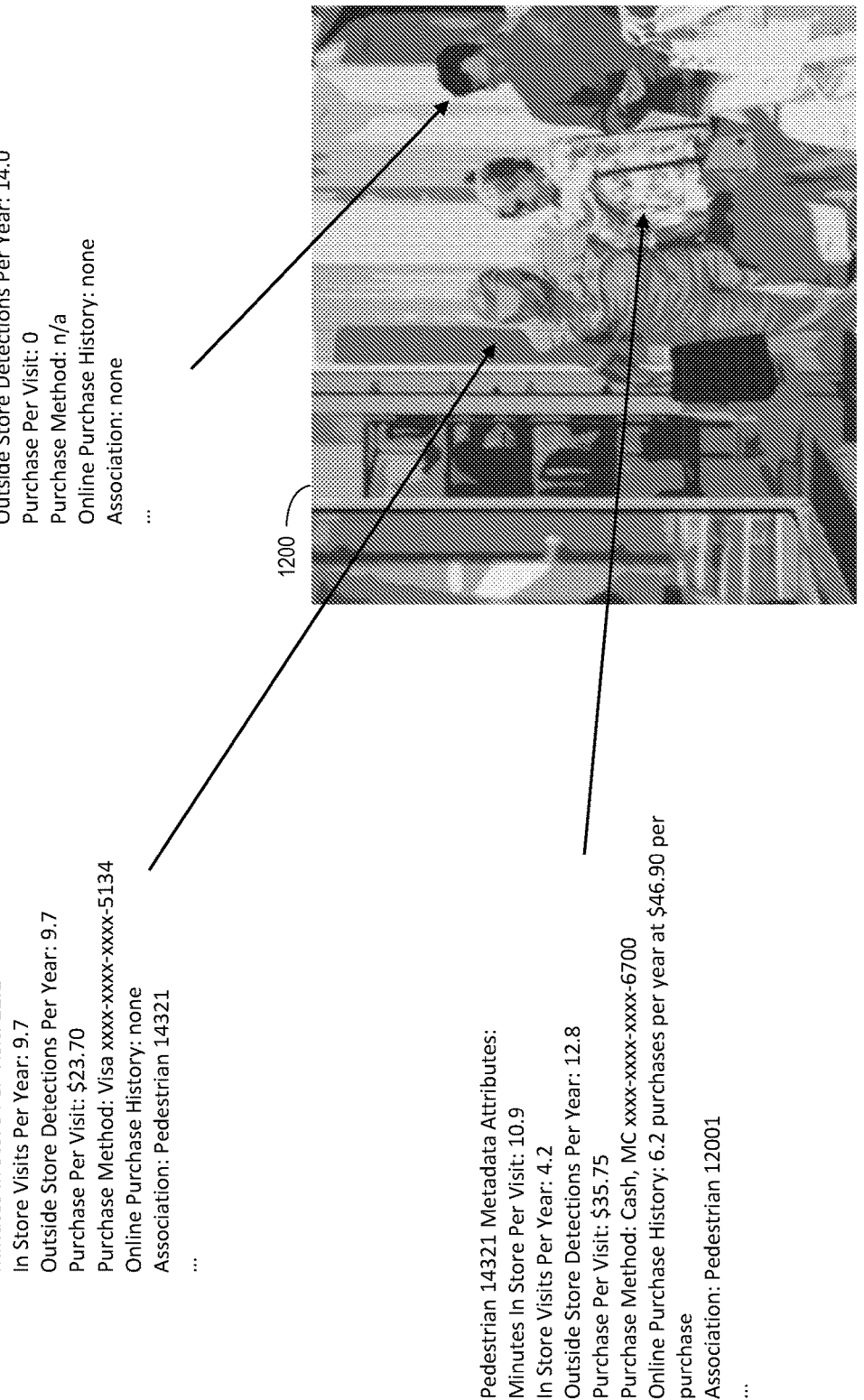

FIG. 12

SYSTEMS AND METHODS FOR DERIVING LEADING INDICATORS OF ECONOMIC ACTIVITY USING PREDICTIVE ANALYTICS APPLIED TO PEDESTRIAN ATTRIBUTES TO PREDICT BEHAVIORS AND INFLUENCE BUSINESS OUTCOMES

CROSS-REFERENCE TO RELATED APPLICATIONS

The present invention is a continuation-in-part of U.S. patent application Ser. No. 17/840,390, titled SYSTEM AND METHODS FOR DERIVING LEADING INDICATORS OF ECONOMIC ACTIVITY USING PREDICTIVE ANALYTICS, filed Jun. 14, 2022, which is a continuation of U.S. patent application Ser. No. 16/797,640, now issued U.S. Pat. No. 11,361,202, titled SYSTEMS AND METHODS FOR DERIVING LEADING INDICATORS OF FUTURE MANUFACTURING, PRODUCTION, AND CONSUMPTIONS OF GOODS AND SERVICES, filed Feb. 21, 2020, the entire contents of which are hereby incorporated by reference.

TECHNICAL FIELD

The present invention relates, generally, to systems and methods for modeling complex economic and commercial systems and, more particularly, to the application of predictive analytics and machine learning, deep learning, active learning and other artificial intelligence techniques to the prediction of future economic performance based primarily on pedestrian attributes observed in the environment.

BACKGROUND

Historically, the prediction of future economic activity has been based on lagging indicators, such as historical trends in retail sales, industrial production, average prime interest rates, unemployment levels, wage growth, interest rates, inflation rates, monthly housing starts, broadband internet penetration, crop planting and yield reports, and similar economic metrics. These indices are important tools to a wide range of individuals and financial institutions, particularly securities traders, fund managers, government regulators, and the like.

Currently known methods for predicting economic activity and associated metrics are unsatisfactory in a number of respects, in part because they rely on intuition, heuristics, publicly available documents (e.g., aggregated quarterly reports for a sector), and/or "technical analysis" of numerical trend data. Trades, positions, and other investment decisions are often based on real time inferences drawn from these indices. High asset value fund managers know that beating a forecast by even a fraction of a percentage point— or receiving pertinent information just seconds earlier than a manager of a competing fund—can instantly result in billions of dollars gained (or lost). Thus, fund managers relentlessly seek real-time "hints" to incrementally sharpen their vision of future economic performance.

More generally, the complexity of unstable market forces, combined with the not-always-rational behavior of its participants, suggests that no single factor can reliably predict future performance, even within a discrete market sector. Rather, multiple factors often coalesce within a fire hose of disparate data streams and datasets, rendering them beyond the grasp of even the most astute financial scholars. Indeed, one estimate suggests that, by the year 2025, global data production will exceed 460 exabytes ($10^{18}$ bytes) per day. It is simply not possible for human beings to perform traditional hypothesis testing on data of these magnitudes.

Thus, there is a long-felt need for improved methods of identifying, collecting, synthesizing, and processing groups of data to correctly predict the value and/or state of variables which characterize future economic activity or behavior, as well as for improved ways of discovering, vetting, testing, and quantifying the correlations among the factors upon which predictive models are built.

SUMMARY OF THE INVENTION

Various embodiments of the present invention relate to systems and methods for, inter alia: i) using observed pedestrian attributes (e.g., appearance and behavior) as factors for predicting future levels of manufacturing, production, and consumption of goods and services; ii) identifying and characterizing correlations among the pedestrian-centric factors; iii) identifying and harnessing sources of such data to facilitate quantitative analysis of the factors; iv) applying predictive analytics techniques to the factors, the correlations among the factors, the data streams and datasets associated with the factors, the quantitative analysis of the data and the correlations among datasets; v) using information derived from the application of predictive analytics to yield potential leading indicators of economic activity based on the pedestrian-centric datasets selected from a range of available data sources; vi) generating and testing hypotheses utilizing machine learning, deep learning, active learning and/or other artificial intelligence techniques; and vii) applying supervised and/or non-supervised learning techniques in the context of a hypothesis generating and testing system to recursively refine datasets and known correlations among them, identify new data sources, identify or refine new correlations, develop or refine existing analytic and predictive models.

BRIEF DESCRIPTION OF THE DRAWING FIGURES

The present invention will hereinafter be described in conjunction with the appended drawing figures, wherein like numerals denote like elements, and:

Figure 9:
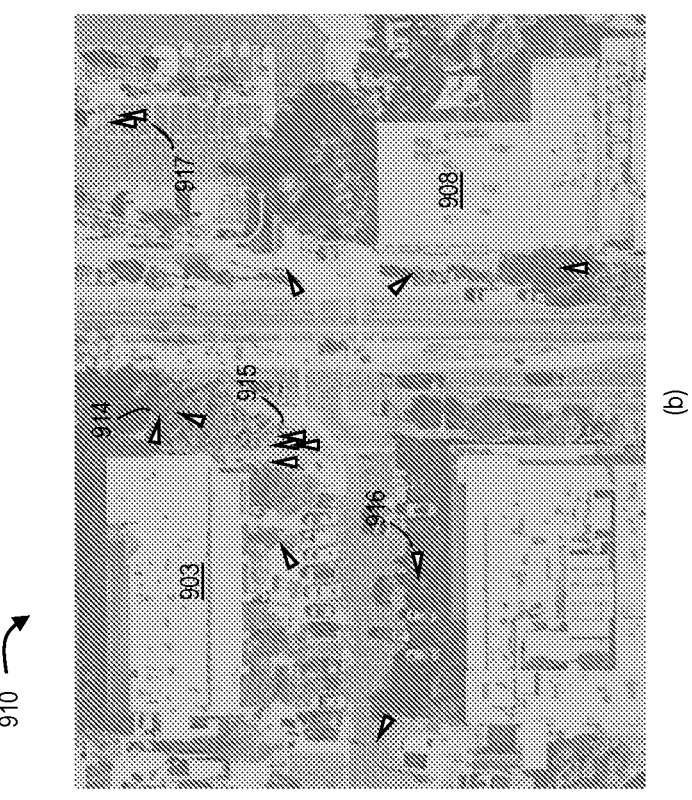
Figure 9:
Figure 9:
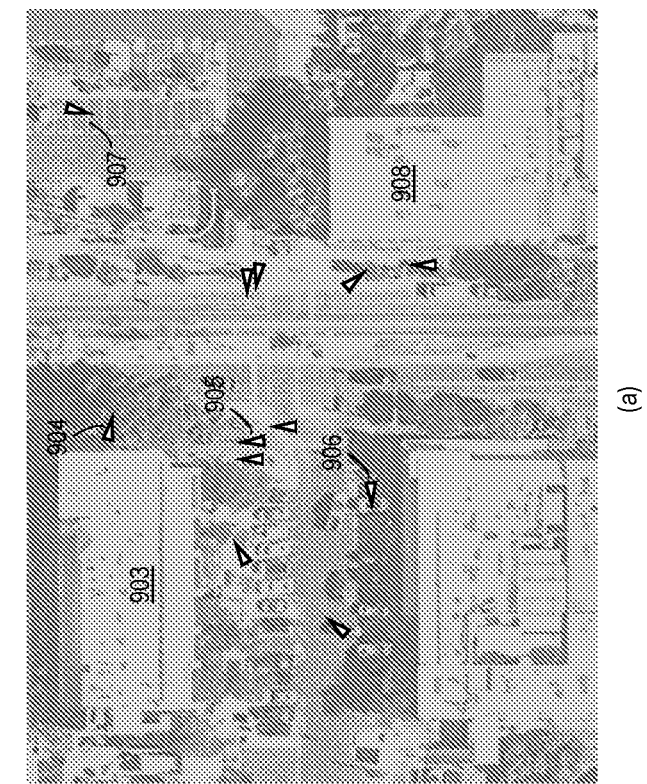
Figure 10:
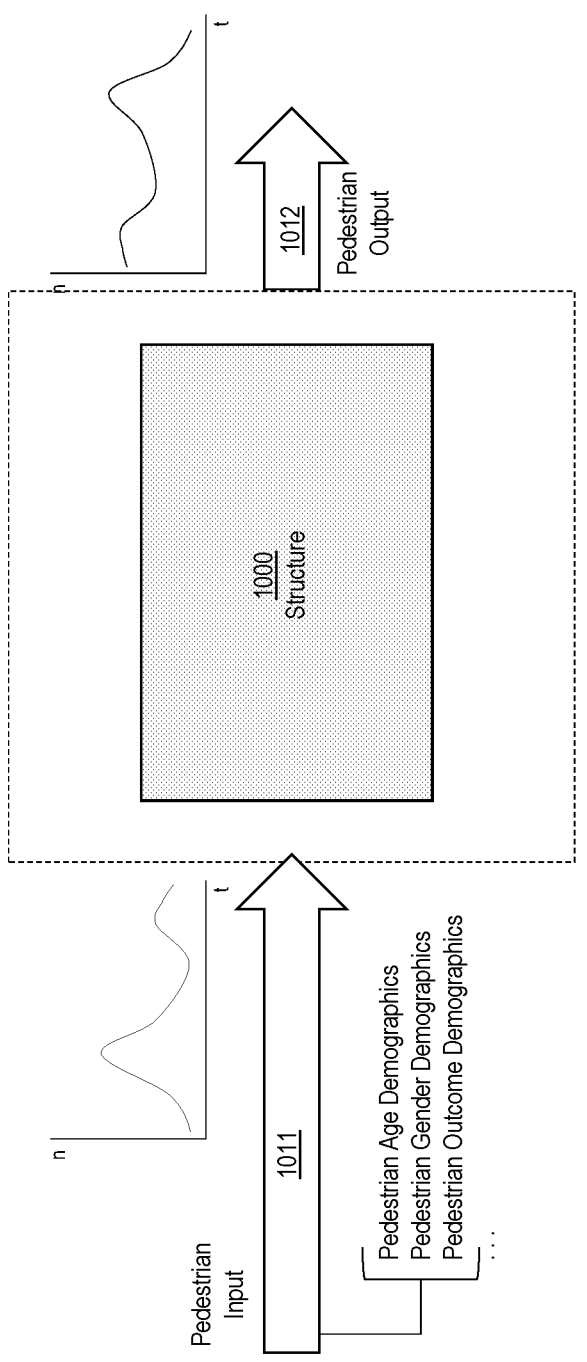
Figure 11:
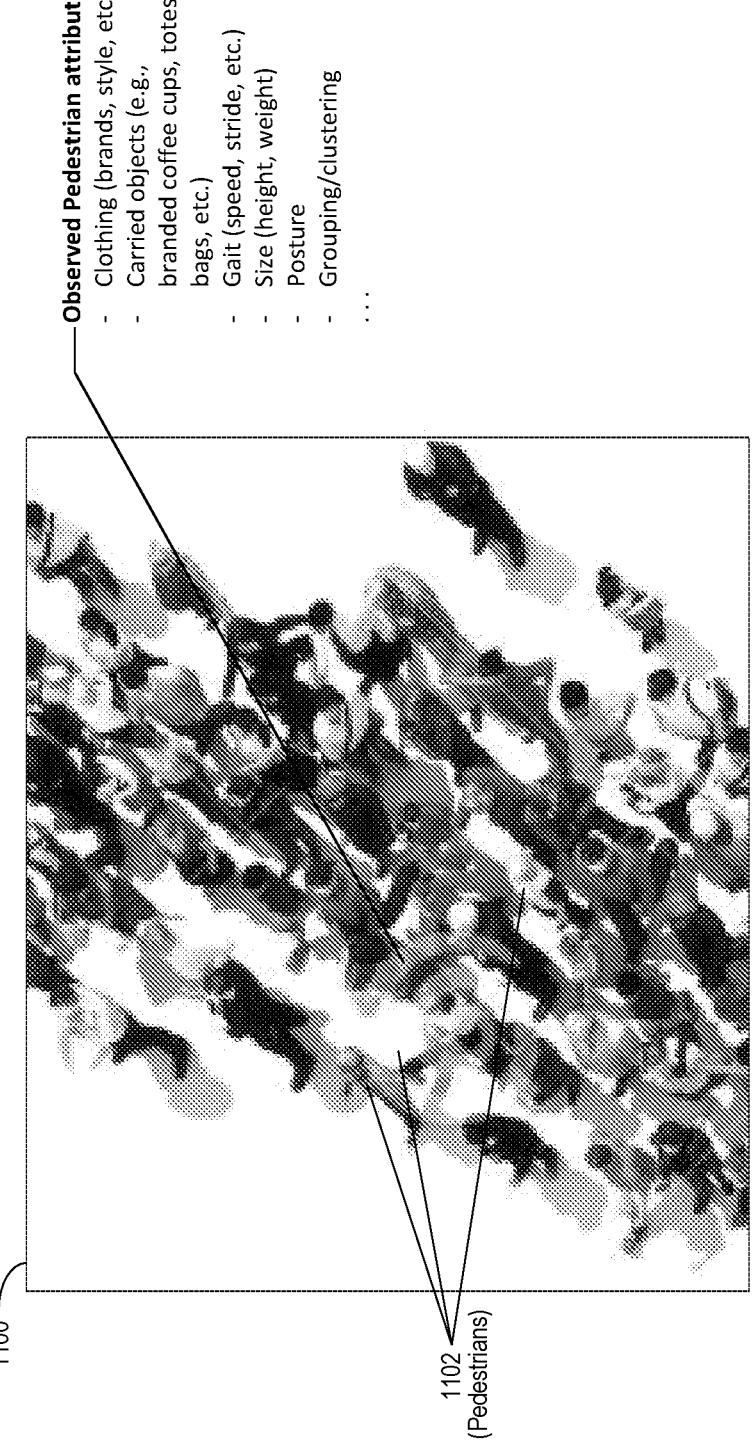

FIG. 9 presents a pair of aerial images of pedestrians useful in describing the present invention;

FIG. 10 is a conceptual block diagram useful for describing pedestrian flux and other aspects of the present invention;

FIG. 11 is an example crowd image useful for describing various aspects of the present invention; and FIG. 12 is an image of pedestrians useful for describing additional aspects of the present invention.

DETAILED DESCRIPTION OF PREFERRED EXEMPLARY EMBODIMENTS

The present disclosure relates to improved techniques for identifying and quantifying leading indicators of future levels of manufacturing, production, and consumption of goods and services, and to machine learning systems and methods for predicting economic activity and producing actionable leading indicators of that activity. Furthermore, the present subject matter presents a generalized hypothesis generating and testing system that may be employed for the purposes of generating such leading indicators. In addition, the present subject matter describes methods by which users may subscribe to proprietary services to gain access to the indicators. In that regard, the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to economic indicators, securities trading, market activity, machine learning models, and data analytics techniques may not be described in detail herein.

Figure 1:
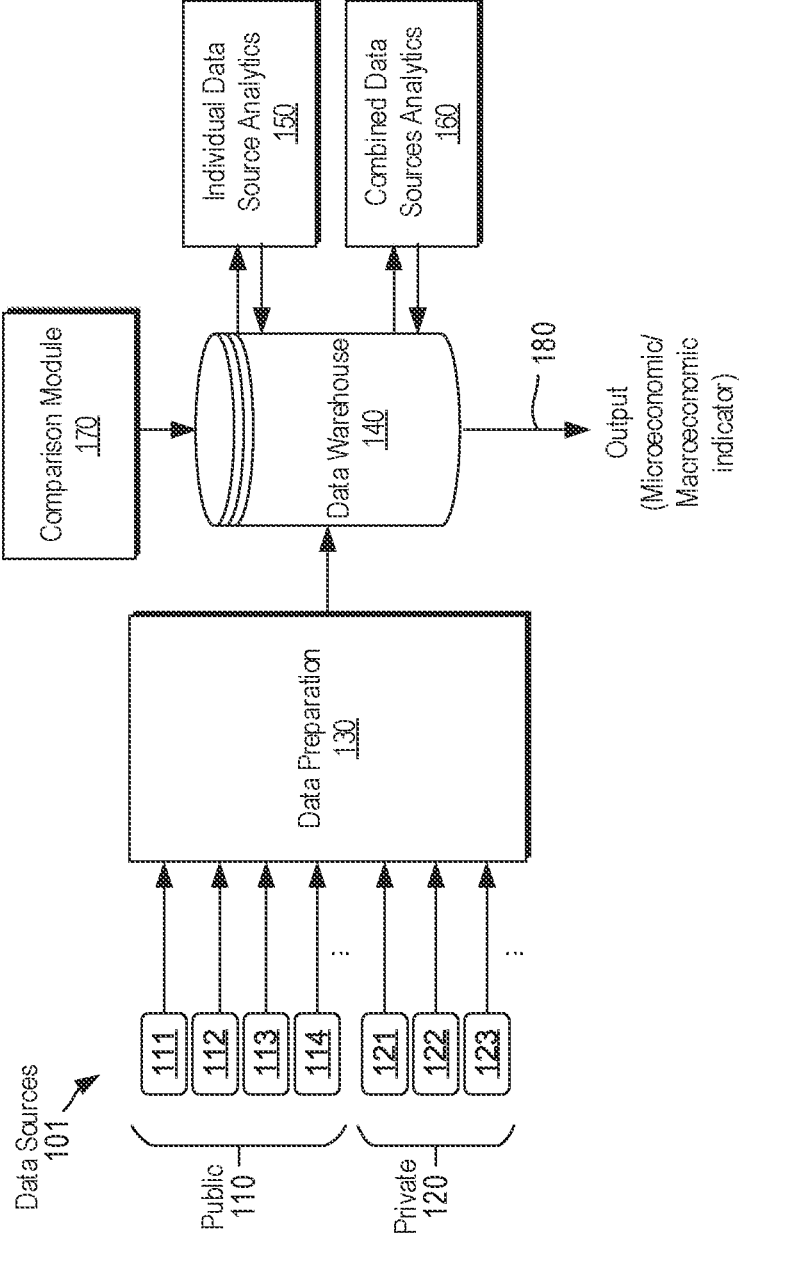
FIG. 1 is a conceptual block diagram illustrating predictive analytics system in accordance with various embodiments.

Referring first to the conceptual block diagram of FIG. 1, various embodiments may be implemented in the context of a predictive analytics system ("PAS") 100. As illustrated, PAS 100 includes a data preparation module 130 configured to receive data from a wide range of data sources 101 (e.g., 111-123), some of which might be public (110) as described in more detail below, and others that that might be private (120). Data preparation module 130 is generally configured to clean and otherwise process the data received from data sources 101 and subsequently store the processed data in a data warehouse 140. Two analytics modules (150, 160) and a comparison module 170 interact with data warehouse 140 in order to produce, using the factors and predictor variables derived from data sources 101, an output 180 which, as described in further detail below, corresponds to a target variable corresponding to a microeconomic and/or macroeconomic leading indicator.

Data Sources

As a preliminary matter, it will be understood that the data received from data sources 101 may take a variety of forms and may exhibit or embody one or more of a wide range of attributes. Thus, for example, the data will often take the form of discrete or continuous numerical data (e.g., integers, floating point numbers, etc.) or categorical data (e.g., unordered or ordered categories). The data may be provided, for example, as a series of time-varying scalar values, as matrices or tables, as an arbitrary tensor of a given dimensionality, or any other form now known or later developed. Data sources 101 and the datasets derived therefrom are thus the predictor variables used for producing the associated machine learning model(s). In that regard, the phrase "machine learning model" may be used to refer to a set of individual machine learning models, each having a different type and purpose. For example, a convolutional neural network (CNN) model may be used to perform object detection and classification in a scene, while a separate CNN may be used to determine the speed and/or acceleration of an object in a scene.

In addition to pre-processed summary and descriptive statistics, data sources 101 may represent the output of one or more sensors configured to determine a binary or non-binary value or state of the environment and provide a raw or processed stream of information relating to that environment (or objects within the environment). Non-limiting examples of such sensors include optical cameras (for providing discrete or sequential data frames representing images or video feeds), infrared cameras, LIDAR sensors (producing point-clouds of objects in the environment), SONAR and RADAR sensors, microphones, acoustic mapping sensors, natural language processing systems, vibration or weather-related sensors (temperature, humidity, seismic activity, etc.), proximity sensors, gas detectors, pressure sensors, soil monitoring sensors, and the like.

Data sources 101 may be categorized as either public (110) or private (120). As used herein, public or "open" data sources are those sources of data that are generally available free of charge (or for a nominal fee) to individuals and/or corporate entities, typically in electronic form via the Internet. Such public data sources may be provided, in many instances, by governmental entities, but might also be provided by (or otherwise available from) private companies. In contrast, "private" data sources are those that are fee based, behind a paywall, or otherwise require a form of permission for access. With respect to both public and private data sources, the data itself may be anonymized, pseudonymized, or provided in accordance with a differential privacy (DP) protocol.

Non-limiting examples of public data sources include: (1) social media feeds (e.g., Facebook, Twitter, YouTube, Instagram, Tumblr, Pinterest, Facebook Graph API, LinkedIn, Social Mention, WeChat, Baidu, Google Trends, etc.); (2) mapping and satellite data (Google Maps, Google Earth, MapQuest, Bing Maps, Apple Maps, etc.); (3) municipal street, highway or port of entry traffic, waterway, shipping dock or seaport vessel traffic, airport commercial or passenger aircraft traffic, railway commercial or passenger traffic, pedestrian traffic camera feeds; (4) open datasets relating to global issues, such as the World Health Organization (WHO) Open data repository, Google Public Data Explorer, the European Union Open Data Portal, the U.S. Census Bureau; (5) financially focused open data sources such as the UN Comtrade Database, the International Monetary Fund (IMF) datasets, the U.S. Bureau of Economic Analysis, the U.S. Securities and Exchange Commission, the National Bureau of Economic Research World Bank Open Data; (6) crime data, such as the FBI Uniform Crime Reporting Program, the National Archive of Criminal Justice Data (NACJD); (7) academic datasets, such as Google Scholar, Pew Research Center, National Center for Education Statistics; (8) environmental data, such as Climate Data Online (CDO), National Center for Environmental Health (NCEH), the IEA Atlas of Energy; (9) business directory data, such as Glassdoor, Yelp, LinkedIn, Open Corporates, and the like.

Private data sources may include, for example, Bloomberg, Capital IQ, and Thompson Reuters financial databases, as well as other subscription-based access to audio, video, or image feeds that may be provided by various entities. Additional data feeds might include onboard vehicle camera data sources provided by commercial or passenger vehicle manufacturers or third party or public transportation operators, security camera feeds provided by commercial or residential real estate property owners or their leased business owners. Location and movement tracking information may be derived from global positioning systems, mobile phone or radio tower tracking, retail order or financial banking, credit card, debit card, mobile phone, social media-based, cryptocurrency, purchase or currency exchange transaction information. Private data sources might also include purchase, shipping and receiving tracking information for parcels, goods, services; crop planting, harvesting and yield information; livestock breeding, fishing, herding or other animal production or slaughter information; raw material or refined goods production, storage, sale or trading information such as crude and refined oil or natural gas as well as minerals, lumber, cement or other physical materials; service call records; and equipment utilization or tracking information.

In accordance with edge-computing or cloud-computing principles, video and/or still image data may be processed or analyzed to extract relevant information prior to being provided to data preparation module 130. For example, object detection and classification may be performed on images based on an appropriately trained convolutional neural network (CNN) model, and the resulting classifications and or regression parameters may be stored as metadata, as described in further detail below. In other embodiments, data sources 101 provide raw, unprocessed data that is handled by data preparation module 130.

Example 1—Transportation

While the present invention may be utilized in a wide range of data sources, in accordance with one embodiment, system 100 is used to make inferences—and produce an appropriate leading indicator output 180 (e.g., a temporally leading indicator)—based on observations relating to transportation activity, such as the behavior and cargo of marine vessels, commercial trucks, and the like.

Figures 3, 4A, 4B:
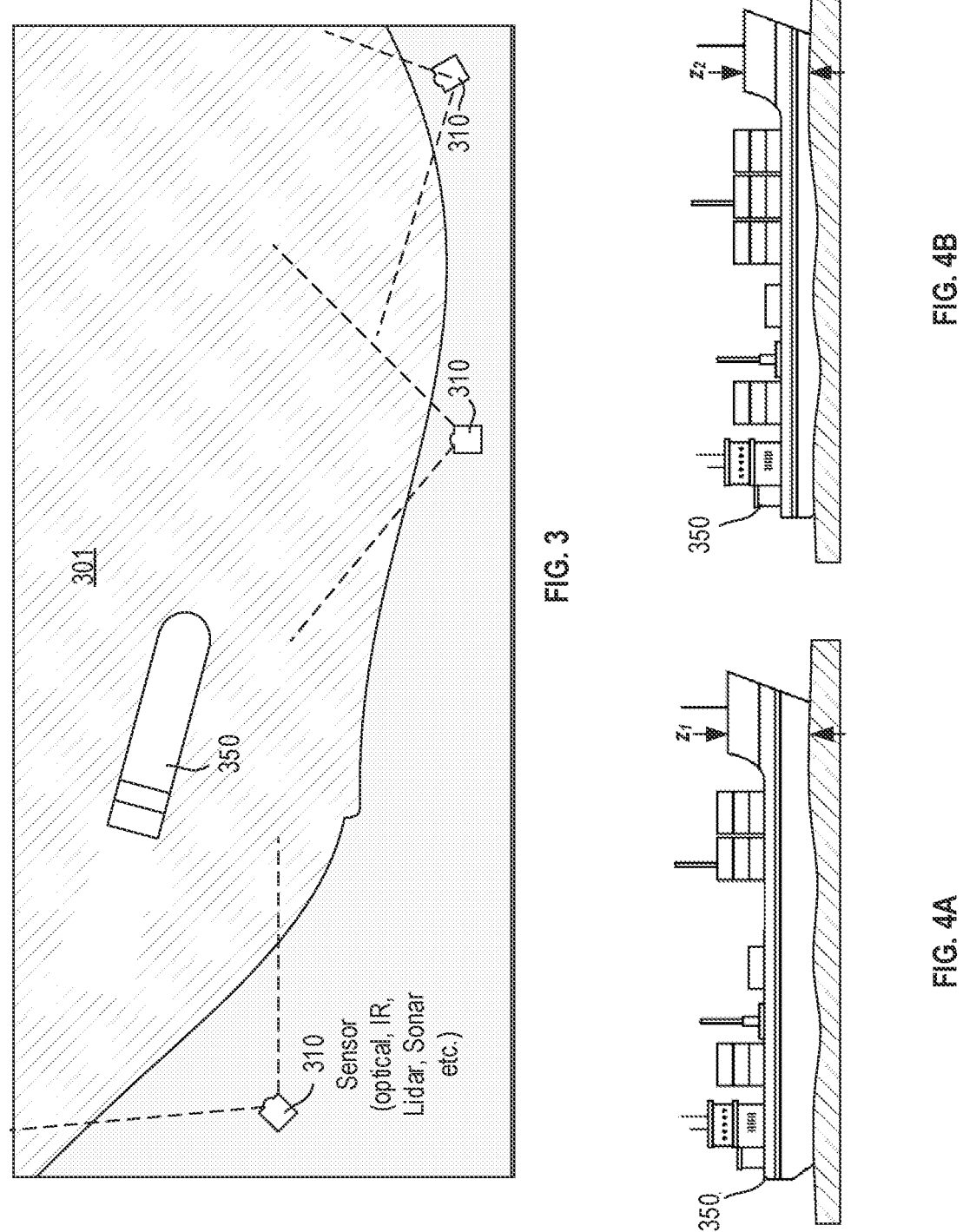
FIG. 3 is a top down view of a port environment useful in described various embodiments.
FIGS. 4A, 4B and 5 illustrate a marine vessel in accordance with various embodiments.

In that regard, FIG. 3 depicts an example marine port environment 301 as seen in aerial view. More particularly, a shipping vessel 350 is seen navigating a waterway close to the shore, where a number of sensors 310 have been deployed. In one embodiment, for example, sensors 310 are cameras (e.g., a combination of IR and optical cameras) whose positions and orientations give them a view of the approaching vessel 350. Thus, sensors 310 correspond to one or more data sources 101 as illustrated in FIG. 1, and may be considered a public data source (e.g., a stationary Internet webcam) or a private data source (e.g., camera access provided for a fee). Sensors 310, when used in conjunction with the predictive analytics system 100, is capable of observing a number of attributes of vessel 350.

For example, referring now to FIGS. 4A and 4B, sensors 310 may be used to produce images that can be analyzed to determine the position of vessel 350 in the water—e.g., before and after loading its cargo. Comparing FIGS. 4A and 4B, it can be seen that the vertical linear dimension $z_1$ as shown in FIG. 4A is greater than $z_2$ in FIG. 4B. From this, a properly trained model, knowing the tonnage of vehicle 350, may be used to determine the weight of the loaded goods. In cases where the observed shipping containers is largely unchanged, this information can be used to infer how many of the shipping containers are empty, and how many are full.

While not illustrated in the drawings, a further machine learning or deep learning model (e.g., a convolutional neural network) may be used to identify the nationality and/or corporate owner and/or the unique identity of vessel 350 via its shape, signs, colors, and markings. In this way, the unique features of vessel 350 allow it to be tracked from port to port. In addition, to the extent that the shipping containers themselves are visible, a further model may be used to determine the type and origin of the goods themselves.

Figure 5:
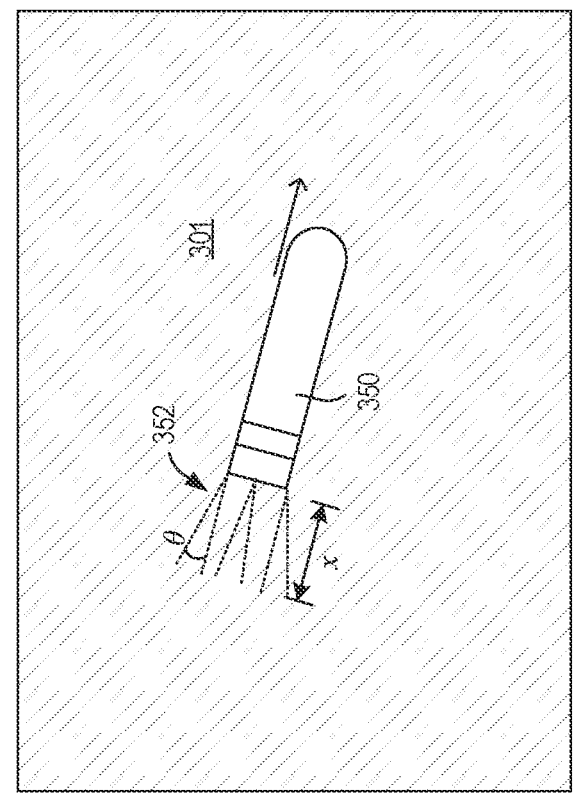

In addition to the side view images provided by sensors 310, other available data may be employed to characterize the behavior of vessel 350. For example, referring now to FIG. 5, the wake region 352 extending from the stern of vessel 350 may be analyzed from its top view image (as might be available from satellite data). That is, both the dispersion angle θ and wake distance x may be correlated to the amount of water being displaced over time, which will directly correlate to weight and speed of the vessel, which itself relates to the amount of goods being transported.

Example 2—Parking Lot Observations

Figure 6A:
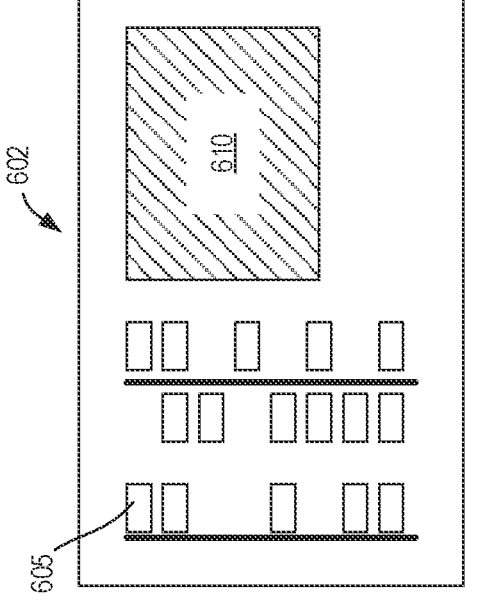
FIGS. 6A and 6B illustrate aerial views of a parking lot showing variations in the number of parked consumer vehicles.
Figure 6B:
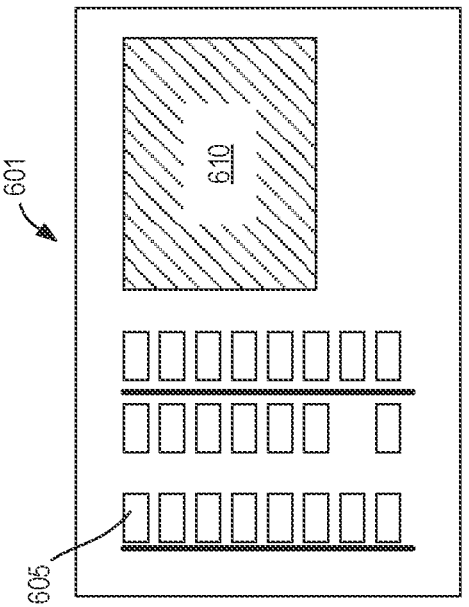

In accordance with another embodiment, system 100 may be used to make inferences based on parking patterns associated with retail store locations. Referring to FIGS. 6A and 6B, for example, the type and number of vehicles parked near a business 610 may be analyzed over time from aerial view images. Thus, consider FIG. 6A, which illustrates a relative large number of vehicle 605 within parking lot 601. At some other time (e.g., the same time and day a week later), as illustrated in FIG. 6B, much fewer vehicles 605 are visible in that same parking lot at a later date (602). This may be used to infer that business 610, and perhaps even the whole sector of which business 610 is a member, is likely to experience and eventually report to the market, a downturn in business activity.

Further in accordance with this embodiment, the actual make and model of vehicles within parking lot 601, 602 may be used to infer economic activity and the demographics or socio-economic status of their patrons or customers. For example, consider the case in which business 610 provides very low cost furniture. It might be determined, via a predictive analytics model, that the average value of the vehicles in parking lot 601 correlates to the overall economic health of the community. More particularly, in one year, the mean price (determined via publicly available data) of the vehicles might be $7,000, with a standard deviation of $3000. In a subsequent year, in which the upper middle class (i.e., a group of individuals who would not typically shop at business 610) might be struggling financially, the mean price of the vehicles might increase to $24,000, with a standard deviation of $20,000. This information could not only prove to be valuable for a financial analyst, fund manager, stock trader, etc. but could also be valuable for the business owner whose demographic is changing.

Example 3—Agriculture

In accordance with another embodiment, system 100 may be used to make inferences relating to agricultural economic indicators. In such cases, data sources 101 might include, without limitation: (1) satellite images of farms as they change over time, which can be used to determine the types of crops being planted regionally, timing of harvests, impact of weather on crop, etc.; (2) publically available information from government agencies re crop yields and types by region, crop types; (3) public data on regional climate patterns, such as rainfall, freeze temperatures, droughts, flows, snow, fires, and the like; (4) sensing data from individual farms or groups of farms; (5) agriculture commodity market prices for local, regional, international markets; (6) road camera images that show transportation of harvested and processed goods over time; (7) satellite imagery illustrating crop storage. In accordance with this embodiment, the output 180 may relate to commodity price predictions or any other related agricultural indices.

Data Preparation

Referring again to FIG. 1, data preparation module 130 includes any suitable combination of hardware, software, and firmware configured to receive data from data sources 101 and process the data for further analysis by system 100. The processing required by each data source 101 will generally vary widely, depending upon the nature of the data and the use that will be made of the data. Such processing might typically include, for example, data cleaning (e.g., removing, correcting, or imputing data), data transformation (e.g., normalization, attribute selection, discretization), and data reduction (numerosity reduction, dimensionality reduction, etc.). These techniques are well known in the art, and need not be described in further detail herein.

In addition to standard data pre-processing techniques, data preparation module 130 may also assign a consistent form of meta-data to the received data streams. That is, one limitation of prior art data analysis techniques is that data sources 101 are available in a variety of forms. Sometimes the "meaning", context, or semantic content of the data is clear (e.g., data table fields with descriptive labels), but in other cases the data may not include a data description and/or might include non-intuitive terms of art. Accordingly, one advantage of the present invention is that it provides a consistent metadata structure and syntax used to characterize the data and facilitate future analysis (e.g., using the hypothesis generating and testing program, described below). In one embodiment, this metadata structure is a fundamental and critical enabler of assisted learning and/or unsupervised learning techniques. The metadata may take a variety of forms (e.g., XML, RDF, or the like), and may include any number of descriptive fields (e.g., time, date range, geographical location, number of shipping containers observed, nationality of vessel, sensing system make and model information as well as sensitivity or resolution, analytic methods or model revision information used to perform any cleansing, analysis, etc.).

Comparison Module

Comparison module 170 is generally configured to compare the predictions made via the leading indicator output 180 to the actual, ground-truth values that occur over time. In this way, comparison module 170 assists in validating models as well as signaling to data source analytics modules 160 and 150 that a particular model may need to be further tuned or replaced altogether with a different or more refined version of the model.

In some embodiments, comparison module 170 monitors the predictive power of output 180 and takes an action when the correlation coefficient or other statistical metric of the model falls below some minimum correlation, accuracy, or precision level. That action might include, for example, re-running the model on new data, using a different predictive model, and/or temporarily stopping production of a given output 180. In some embodiments, the hypothesis generating and testing system 800 (described below) may be used to train, validate, and test a new model based on its hypothesis testing results.

Data Source Analytics

Data source analytics modules 150 and 160 include suitable hardware, software, and firmware configured to produce and refine predictive analytic models to be used to produce the leading indicator output 180. That is, modules 150 and 160 take the predictor variables derived from the various data sources (i.e., past data) and build a model for predicting the value of a target value (also based on past, historical data) associated with an economic activity metric. The trained model is then later used to predict, using current or contemporaneous information from the data sources, the future value of that economic activity metric.

As a preliminary matter, the phrase "predictive analytics" is used in the sense of analytic models that are "forward-facing" and are evaluated based on how well they predict future behavior, rather than "descriptive analytics," which are primarily "backward-facing" techniques meant to characterize the nature of the data in the simplest way possible. Thus, for example, Occam's razor and descriptive analytics might suggest that a dataset can be fitted in a manner that produces reasonable $R^2$ and correlation values using a simple linear regression model, while that model may not be as proficient at actually predicting future values when compared to a heterogeneous ensemble model that combines decision trees, neural networks, and other models into a single predictor or series of predictors.

In accordance with the present invention, data source analytic modules 150 and 160 are implemented as one or more machine learning and deep learning models that undergo supervised, unsupervised, semi-supervised, reinforcement, or assisted learning and perform classification (e.g., binary or multiclass classification), regression, clustering, dimensionality reduction, and/or such tasks.

Examples of the models that may be implemented by modules 150 and 160 include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), and linear discriminant analysis models. In addition, data sets may be derived using natural language processing (NLP) techniques, such as GPT3 (including, for example, ChatGPT-type interpretation engines), or the like.

In accordance with various embodiments, CNN techniques are applied to those data sources 101 that include imaging, video and/or audio data. In this way, object detection and classification can be performed. For example, publicly available imaging data may be analyzed to determine the number, class, and origin of trucks traveling on a roadway at a particular time (e.g., Amazon Prime trucks, FedEx or UPS vehicles, and the like). A trained CNN may also be used to observe marine vessels in the vicinity of a port (as described in further detail below) and determine the number and type of offloaded shipping containers. In yet other embodiments, aerial image data of parking lots or other public spaces may be analyzed to perform object detection and classification of consumer vehicles. Security cameras in a retail shopping mall or a commercial office complex could be used to determine the number and type of shoppers or employees coming at various times and match that information with the types of bags they are carrying, clothes they are wearing, their ages, vehicles they are driving in, etc.

Data Warehouse

Data warehouse 140 is configured to store the various structured and unstructured data generated or otherwise processed by data preparation module 130, comparison module 170, and data source analytics modules 150 and 160. In that regard, data warehouse 140 may be implemented using a variety of known data storage paradigms, including, for example, a relational database management system (RDBMS) such as Oracle, MySQL, Microsoft SQL Server, PostgreSQL, or the like. Data warehouse 140 may also be implemented using NoSQL databases, distributed databases, schema-free systems (e.g., MongoDB), Hadoop, and/or any other data storage paradigm now known or later developed.

Microeconomic/Macroeconomic Indicators

Output 180 of system 100 may be any indicator or set of indicators that are capable of predicting, alone or in combination with other indicators, the state of a microeconomic and/or macroeconomic system—for example, a metric that characterizes that space. This system may be global, national, regional, online, or any other subset of economic activity, may take a variety of forms, and may correspond to a wide range of attributes.

As with the data sources described above, output 180 will often take the form of discrete or continuous numerical data (e.g., integers, floating point numbers, etc.) or categorical data (e.g., unordered or ordered categories). Output 180 may include a series of time-varying scalar values, one or more matrices or tables, or higher order tensors of numeric values. Output 180 may also be Boolean (e.g., True/False) or may contain the output of deep learning applied image, video or audio inference.

In general, indicators of economic events can be categorized as either leading indicators (which precede economic events), lagging indicators (which occur after economic events), or coincident indicators (which occur at substantially the same time as economic events). In accordance with the present invention, output 180 is preferably either a leading indicator or, when output 180 can be provided to a subscriber very quickly, a coincident indicator.

The semantic meaning of output 180 may vary depending upon context. In the shipping scenario, for example, output 180 might include the estimated weight of some good, such as automobiles, clothing, cellular phones, or the like, imported into the country during a certain timeframe. In a parking scenario, output 180 might be the number and/types of vehicles parked at a set of observed locations. In the context of agricultural products, output 180 might include, for example, the percentage of hemp crops that appear to be unusually dark in aerial view images.

The output 180 might also include information that indicates levels of construction activity derived by monitoring construction vehicles, movements of heavy equipment, physical changes to construction sites that is then correlated to government published housing starts information and the published reports from corporations involved in construction to create predictive metrics of building activity. The same techniques could be used to track the rate of lumber harvesting, lumber mill activities, livestock farming, road/bridge/building construction, surface mining or mineral collection, chemical refining processes, loading/shipping/unloading of goods at ports of entry, vehicles being sold from a retail car lot, vehicles in inventory after manufacturing, cargo or passenger trains on an entire railway network, to only name a few. These all can be correlated to historical published or private reports of economic activity to model and ultimately predict economic market trends.

Process Flow

Figure 2:
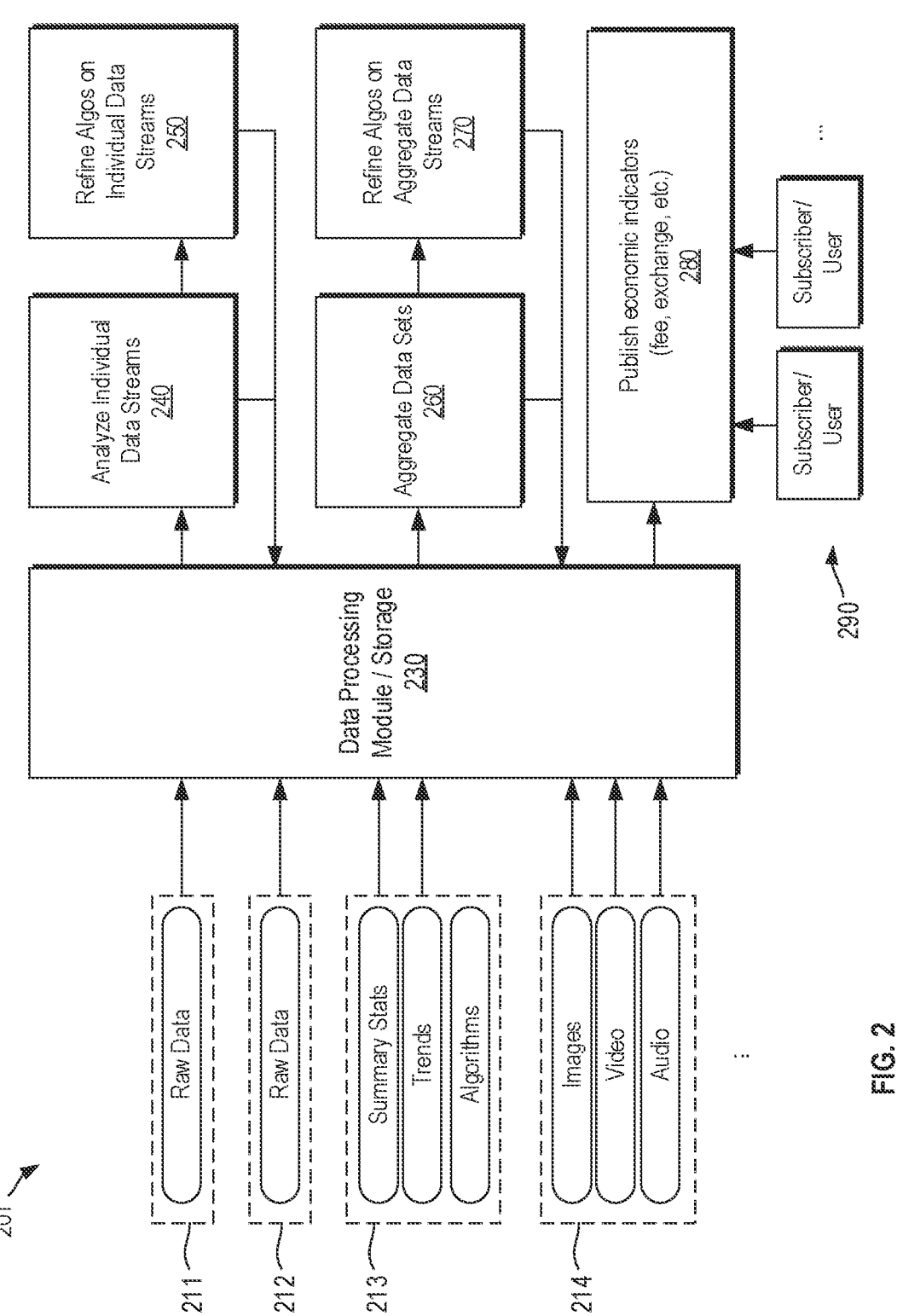
FIG. 2 is a conceptual block diagram and process flow for a predictive analytics system in accordance with various embodiments.

FIG. 2 presents a combination block diagram/flow chart that illustrates, generally, the way information and data may flow through PAS 100 as illustrated in FIG. 1. More particularly, referring now to FIG. 2 in combination with FIG. 1, data sources 201 may include various raw data streams (211, 212) as well as composite data types such as, for example, summary statistics, trends, and algorithms (213), or images, video, and audio streams (214). Data sources 201 in FIG. 2 thus generally correspond to data sources 101 in FIG. 1.

Similarly, data processing and storage module 230 in FIG. 2 generally corresponds to data preparation module 130 and data warehouse 140, and is configured to clean, sort, filter, concatenate, process, and otherwise format the data from data sources 201. Subsequently, individual data streams are analyzed (module 240) and then the various predictive analytics models for those data sources are refined and fed back to module 230 (via module 250). In general, the phrase "dataset" as used herein refers to a portion or subset of data received from a data stream. In parallel, aggregate datasets are analyzed (module 260), refined (module 270) and provided back to module 230 for storage. Thus, modules 240 and 250 together correspond to module 150 in FIG. 1, and modules 260 and 270 generally correspond to module 160 of FIG. 1.

Finally, via a publishing module 280, the various leading indicators (generally corresponding to output 180 in FIG. 1) are provided to a set of subscribers/users 290. The published indicators, data models, predictions, may be provided in exchange for a fee (e.g., a one-time fee or subscription fee), or may be provided in exchange for access to privately owned data sources or other information of value to the process as illustrated.

Figure 7:
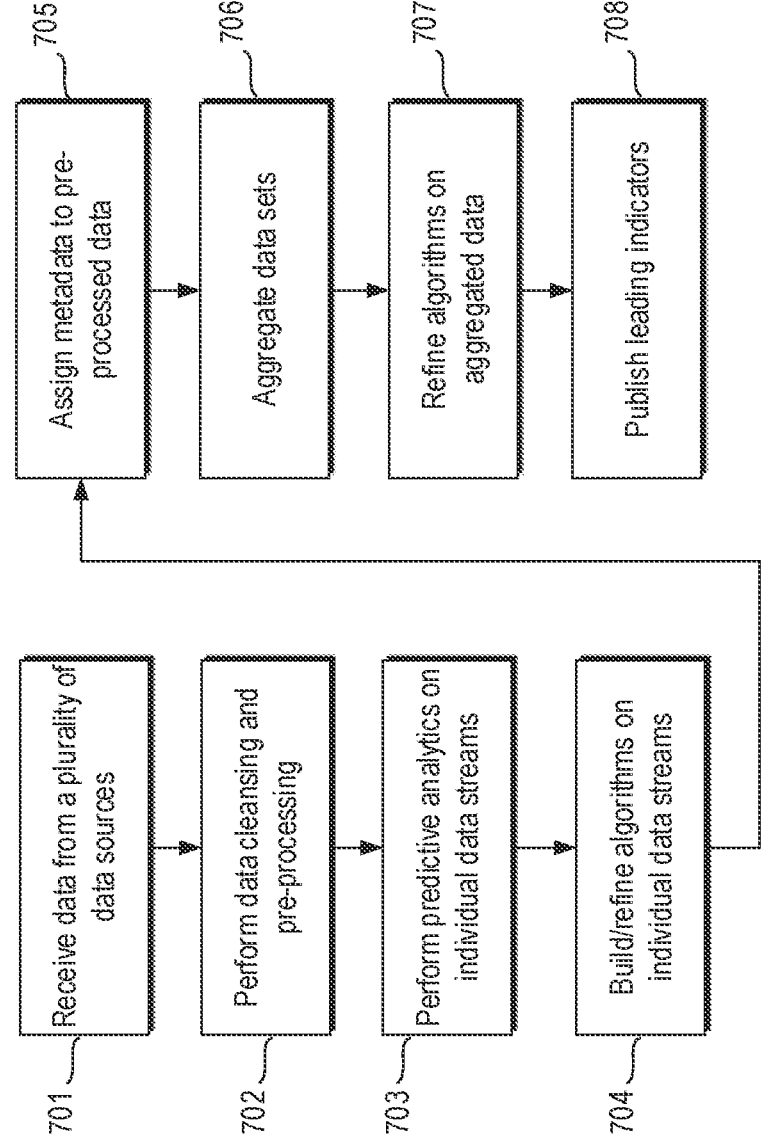
FIG. 7 is a flowchart illustrating a method in accordance with various embodiments.

FIG. 7 is a flowchart illustrating a method 700 in accordance with one embodiment of the present invention, and generally corresponds to the major processes illustrated in FIG. 7. More particular, data is first received from a plurality of data sources (step 701), followed by data cleansing and pre-processing (702). Subsequently, predictive analytics are performed on individual data streams (703) and the resulting models and algorithms are refined (704). Metadata may then be assigned to the resulting data (705). The datasets are aggregated (706), and then the predictive analytics models and algorithms for the aggregated data are further refined (707) as previous described. Finally, the leading indicators are published for use (708).

Generalized Hypothesis Generating and Testing System

As mentioned in the Background section above, predictive factors are likely to be buried in a vast array of fast-moving data streams that cannot be analyzed in the traditional manner by human beings—i.e., the time-consuming process of applying traditional hypothesis testing and the scientific method to such data by humans is impracticable.

Figure 8:
FIG. 8 is a conceptual block diagram of a hypothesis generation and testing system (HGTS) in accordance with various embodiments.

To remedy this, FIG. 8 illustrates a hypothesis generating and testing system (HGTS) 800. In general, HGTS 800 can be seen as a further abstraction of the predictive analytics system 100 of FIG. 1, in that it uses machine learning techniques to teach itself how to form the predictive analytics models described above. Thus, HGTS can be seen as a form of general artificial intelligence operating in the field of economics.

In general, analytics engine 830 is configured to form its own hypothesis (e.g., "variable 1 is correlated to variables 2 and 3") and subsequently test that hypothesis on cached data 831 and/or data sources 801. Thus, engine 830 is capable of performing its own planned experiments. The results and conclusions of its experiments (e.g., correlation coefficients, analysis of variance, etc.) are stored along with the hypothesis and model itself in a metadata format so that ongoing trends in model accuracy can be observed and utilized to further improve both model/algorithm accuracy as well as the hypothesis generating and testing system itself.

In order to facilitate the creation of hypotheses, a consistent metadata format is provided. This allows the system to minimize the effort required for unassisted hypothesis generation and testing by properly presenting data for analysis, thus more-effectively "compare apples to apples." The structure of the metadata may vary, but in one embodiment the metadata includes data format, date range, sensor type, sensor accuracy, sensor precision, data collection methods, location of data collection, data preparation methods performed, image content ranges, NLP methods, data source/publication, and the like.

Referring now to FIG. 8, HGTS 800 generally includes an analytics engine 830 that receives data from data sources 801 (e.g., 811-814 and 821-823), including both public data 810 and private data 820. The nature of this data is the same as previously described in connection with FIGS. 1 and 2. Analytics engine 830 also includes a cached data store 831 for storage of data used in prior experiments.

Engine 830 may begin by performing an initial round of experiments with limited datasets to assess whether a particularly hypothesis is likely to be successful. After initial correlations are found, the engine 830 prioritizes a list of possible hypotheses and seeks to explore those. This is comparable to the separate training, validation, and testing steps used in connection with training machine learning, deep learning, assisted learning or other models.

As is known in the art, a leading indicator may be characterized by its direction relative to the attribute it is being tested against—i.e., procyclical (same direction), countercyclical (opposite direction), or acyclical (no correlation). As illustrated in FIG. 8, after an experiment has concluded, the results (840) inform how the experiment is treated. Specifically, if there is a statistically significant correlation—either positive or negative (i.e., countercyclical or procyclical)—the metadata, model, and data for that experiment are stored in context-aware artificial intelligence database (CAAD) 850. If there is a non-existent correlation (i.e., acyclical), the entire experiment is discarded. If, however, the determined correlation and/or its statistical significance are borderline or otherwise weak, then that experiment may be stored within probationary database 851 for further correlations refinement with additional hypotheses to be tested when additional computation cycles or when additional data become available. This is of critical importance as economic trends are never due entirely to a single factor but rather are a culmination of an extensive set of dependent and independent variables. Thus, as societies change with the advent of new technologies, new geo-political issues, new trade deals, new manufacturing methods, new shipping methods, new laws or policies, new weather patterns, etc. new variables will begin to emerge with greater significance where they previously were irrelevant and vice versa. By storing hypotheses in a probationary database it is possible to trend correlations over time and begin to explore new factors that may be been previously unknown or undervalued in performing economic analyses. This would provide a major advantage for any system of analytics as the prioritization of variables of emerging relevance could become easily identifiable.

The above systems and methods may be used in scenarios where regional epidemics, global pandemics, military or political conflicts, or socioeconomic unrest arise in order to precisely measure the impact in economic activity trends associated with changes in manufacturing, processing, shipping, storage, distribution, and tourism by region, by economic sector and by company. Such information may be a leading indicator used to make more informed investment decisions.

The successful experiments stored within CAAD 850 can then be re-used or incorporated into subsequent experiments by analytics engine 830. Similarly, analytics engine 830 may choose to recall an experiment from probationary database 851 and refine it for further testing—perhaps using a larger or less noisy data set, or changing dependent/independent variables.

Pedestrian-Centric Embodiment

In general, the systems and methods described above may be specifically applied to attributes of pedestrians observed in the environment. In such an embodiment, at least one of the plurality of datasets includes first sensor data derived from direct observation of activity within an environment, and the plurality of datasets includes a set of pedestrian attributes.

In this pedestrian-centric embodiment, the system includes a predictive analytics module and/or an HGTS, as described above. Specifically, the predictive analytics module is configured to train first and second machine learning models using the datasets as a source of predictor variables based on the assigned metadata for each of the machine learning models, and to use historical information regarding a metric of economic activity as a target variable, wherein the first and second machine learning models differ in at least one of machine learning model type and assigned metadata.

The HGTS is configured to train the first and second machine learning models, select the predictor variables for the machine learning models, and determine the leading indicator using the assigned metadata for the machine learning models. As described in detail above, the HGTS includes an analytics engine configured to: assign first and second statistical metrics to the first and second machine learning models; store the assigned metadata, the first machine learning model, and the predictor variables in a primary database in response to determining that the statistical metric assigned to the first machine learning model meets a predetermined level; and store the assigned metadata, the second machine learning model, and the predictor variables in a second, probationary database in response to determining that the second machine learning model exhibits a statistical metric does not meet a predetermined level; and select between the first and second machine learning models based on their respective statistical metric.

In accordance with one embodiment, the set of pedestrian attributes includes (1) pedestrian movement data, (2) pedestrian appearance data, and (3) connections or correlations to other datasets that contain associated information about identified pedestrians.

The pedestrian movement data includes any data associated with the dynamic and/or behavioral aspects on an individual or a group of individuals, such as their observed movement in the environment. As non-limiting examples, the pedestrian movement data may include speed, gait, direction, acceleration, vertical movement, activities being performed, and/or hand gestures.

The pedestrian appearance data includes any data associated with the visual appearance (other than movement data) of an individual or a group of individuals. As non-limiting examples, the pedestrian appearance data may include information relating the age, gender, height, weight, facial expression, clothing, carried objects, luggage, grocery bags, backpacks, travel gear, posture, pets, and/or proximity to other pedestrians. the pedestrian appearance data may also include a plurality of brand names associated with the carried objects. It will be understood that these examples are not intended to be limiting, and that the present invention comprehends any form of appearance information available in any convenient format (e.g., visible light, infrared, etc.).

In one embodiment, the plurality of datasets includes pedestrian experience, activity or outcome data comparing the set of pedestrian attributes prior to pedestrians entering a region-of-interest with the pedestrian attributes after leaving the region-of-interest. That is, pedestrian attributes which may also include identifying characteristics to track individual pedestrians over time.

In this regard, FIGS. 9-10 present various images and diagrams useful in understanding the present invention. Referring first to FIG. 9, a pair of aerial images (901 and 910) are shown, each of which includes pedestrians in the environment during different time periods. For example, 901 (FIG. 9(a)) shows the environment at a first time, and 910 (FIG. 9(b)) shows the environment at a second, later time—the time interval of which may be very short (e.g., about 15 seconds) or fairly long (e.g., about 4 hours). It will be appreciated that these examples in no way limit the invention; however, and that any temporal interval (either fixed or variable) may be appropriate, depending upon the context.

FIG. 9(a) shows, in image 901, the location and direction of a number of pedestrians (e.g., 904, 905, 906, and 907) relative to a number of regions of interest, such as buildings 903 and 908, as well as the associate parking lots, as illustrated. Similarly, FIG. 9(b) shows, in image 910, the location and direction of pedestrians (which may or may not correspond to those identified in image 901) in the same environment. The present invention is capable of examining these images (as well as a series of preceding and subsequent images) to derive models useful in making actionable, economic-related conclusions regarding both the pedestrians as well as the businesses and other regions in the environment.

For example, the system may determine that the building 903 has a tendency to attract more individuals during certain times of the day or during certain weather conditions. It may also determine that individuals that enter building 903 may also tend to enter building 908 after exiting building 903. It might also make certain deductions regarding the parking lots, and types of vehicles, driven by the individuals that frequent buildings 903 and 908. These are just a few examples, and it will be appreciated that such time-series information regarding pedestrian paths may be used to derive a wide range of useful data/information.

In a more general sense, FIG. 10 is a conceptual block diagram useful for describing pedestrian flux and other aspects of the present invention. That is, FIG. 10 illustrates a structure 1000 that experiences an input of pedestrians (1011) and a corresponding output of pedestrians (1012). The number, n, of pedestrians entering and exiting changes over time, as shown in the accompanying graph. This is generally referred to as the flux of pedestrians associated with structure 1000.

Also associated with input 1011 and output 1012 are associated pedestrian attributes, as discussed above. These may generally be categorized, for example, as pedestrian age demographics, gender demographics, outcome demographics, etc. The attributes (both appearance and movement attributes) may be represented using any convenient data structure and may be stored using any appropriate numeric or alphanumeric values, as is known in the art. The differences between output 1012 and input 1011 (in which individual pedestrians may be tracked) present the "outcomes" associated with structure 1000 over some elapsed time period. These outcomes, as described herein, are useful in inferring economic activity.

FIG. 11 is another example crowd image (closer than that shown in FIG. 9) useful for describing various aspects of the present invention. That is, given an image 1100, a number of pedestrians 1102 are observed close enough that many details of their appearance and behavior can be discerned. Such pedestrian attributes may include, for example, clothing (brands, style, etc.), carried objects (e.g., branded coffee cups, totes, bags, etc.), pedestrian gait (speed, stride, etc.), size (height, weight), posture, grouping, head coverings, hair color, facial expressions, and the like.

FIG. 12 is yet another example of an image 1200 of pedestrians useful for describing additional aspects of the present invention, and may be thought of as a pedestrian flux example to be understood in conjunction with FIG. 10. In this example, three individual pedestrians are identified by particular serial numbers (e.g., "14321", "12001", and "15080"), and for each of them, certain attributes (collected and synthesized over time) are stored as metadata, including such attributes as minutes in store per visit, in-store visits per year, outside store detections per year (see, e.g., FIG. 9), purchases per visit, purchase method, online purchase history correlated to the individual, and associations with other individuals (e.g., association between pedestrian 14321 and 12001). Again, it will be understood that the examples illustrated in FIG. 12 are merely offered as examples, and that a wide range of attributes for individuals may be collected and tracked over time.

Moving beyond observed movement and appearance, it is possible (and advantageous) to correlate the set of pedestrian attributes with cash, credit card, or wireless payments made by the pedestrians that can be extracted from a correlation of video or image data, or time-correlated to purchase transaction data. This is also shown, for example, via the "online purchase history" attribute of FIG. 12.

In yet other embodiment, the set of pedestrian attributes is correlated to location services associated with the pedestrians, which could either be derived from wide area network data or correlations to mobile devices using local area network information. That is, GPS and/or WiFi or other locationing data may be correlated to the pedestrian attributes and thereafter used to derive models and outcomes.

The set of pedestrian attributes may also be correlated to audio content received from the pedestrians, which may also include identifying characteristics of the pedestrian and/or movement data. That is, to the extent that audio data is available in an environment where pedestrians are present (e.g., via public announcements of the type one might hear at an airport or bus station, or sound emanating from the cell-phone of an individual watching multi-media clips), that audio data and any semantic content of the audio data may also be collected and correlated to the other attributes of pedestrians observed in the environment.

The information and models derived from pedestrian attributes may be used to track a number of behaviors and outcomes, and be used to determine leading indicators in a variety of ways. For example, the models can be used to track historical information of pedestrians in a plurality of environments and to predict at least one of the reactions, behaviors, and business outcomes of a set or subset of the pedestrians.

For example, the trained models may be used to track historical information of pedestrians in a plurality of environments and to predict at least one of the reactions, behaviors, and business outcomes of a set or subset of the pedestrians. The system may use the database and models to predict how a new store would perform if added to a shopping mall, how a new marketing campaign might perform with clients or customers, how a different store layout might influence spending patterns of shoppers, or how online ads might drive shoppers to physical stores (or vice-versa), among many other possibilities.

In accordance with one embodiment, using the methodologies described, the system performs an analysis of the type, density, volume of pedestrian traffic in a small or large region at a point in time or over time. This may include, for example, analysis of shoppers entering or leaving individual stores or shopping malls, analysis of the density, frequency, demographics of individual commuters to or from public transit, shopping facilities, to dog parks or public parks, to workplaces, to schools, to government facilities, to airports, to museums, to tourism facilities, number and types of pets being walked, types of handbags, briefcases, luggage, strollers, wagons, baby carriers, backpacks or other travel gear being worn, types and frequency of shopping bags being carried, types of clothing being worn, such as suits vs t-shirts can all be quantified to assess how economic changes are occurring in a small or large region.

Using data collected from onboard optical or acoustic vehicle sensing devices, from stationary optical, magnetic, acoustic or other sensing devices such as traffic cameras, kiosks, street light or traffic light cameras, security cameras or any other sensing device, from satellite or other aerial imaging sensors, one can determine the demographics and behavior of individuals. This can be used to estimate wealth of a population, estimate the number of families, number of children, the numbers of commuting workers, activity of businesses, the shopping and work patterns, volume of tourism, amount and type of construction activity, amount and type of shipping and distribution activity, among other details.

Audio or acoustic information can be used to assess the number of times words of interest are spoken, indicating, for example, individual interest in an object, device, product (density and frequency of words like "bagel", "sandwich", "pizza", "sushi", or the like) or their sentiment about experiences (density and frequency of words like love, like, adore vs hate, dislike, or cheap vs expensive, or the like) or the languages being spoken, the demographics of the speaker and their association with different words.

This information can be used to determine relative business activity among competitors in a given area, such as analysis of Target vs. Walmart shopping bags being carried by shoppers, number of people visiting or carrying a Starbucks vs Coffee Bean shop cups, among many other examples. This can be used to provide a quantitative and qualitative assessment of where new businesses should invest (location of new coffee shops, pet stores, hotels, apartments, handbag stores, luxury or economy housing, new or used car dealerships or repair facilities, among other things) or where existing businesses should change their approaches due shopper sentiment or due to new demographic shifts in past, current or future consumers.

Furthermore, image analysis may be used by the present system to assess where shoppers, commuters, workers, and tourists are coming from, how far they are traveling, if they are leaving a facility with more or fewer bags, what type of shopping bags they are leaving with, fuller or emptier shopping carts, if more or fewer are choosing home delivery, as well as what type of vehicle they are placing those items in. This information can be combined, for example, with mobile device network information, geo-locationing, WiFi hotspot activity, mobile network tower pings, and triangulation to provide additional insights.

All of the above data, information, and models can be used to help businesses, governments, investors, economists better understand their customer base and to assess, estimate or predict consumer spending patterns and opportunities and use this to make more informed investing choices with advertising, product placement or distribution, sale prices, etc.

In conclusion, the foregoing describes various systems and methods for applying predictive analytics techniques to produce leading indicators of economic activity based on a range of available data sources, such as pedestrian attributes. In some embodiments, those methods include applying such predictive analytics techniques to produce leading indicators based on public and/or private transportation data, for example, producing the leading indicators based on data sources associated with the direct observation of activity at one or more maritime facilities. In some embodiments, the method includes producing the leading indicators based on aerial view images of consumer vehicles. What has also been described are systems and methods for providing a fee-based subscription system for the sharing of such leading indicators to users. More broadly, the present subject matter also relates to a system for providing a consistent, semantic meta-data structure associated with data and for generating and testing hypotheses utilizing machine learning, deep learning, assisted learning techniques (e.g., via non-supervised learning).

In accordance with one embodiment, a predictive analytics system comprising: a plurality of datasets received from a corresponding plurality of data sources, wherein at least one of the plurality of datasets includes first sensor data derived from direct observation of activity within an environment; a data preparation module configured to assign metadata to the stored datasets; at least one predictive analytics module configured to train a machine learning model using the stored datasets as a source of predictor variables based on the assigned metadata, and to use historical information regarding a metric of economic activity as a target variable; and a publishing module configured to provide, to one or more subscribers, output data including a leading indicator of the target variable based on the trained machine learning model and contemporaneous information received from at least one of the data sources.

In accordance within one embodiment, the first sensor data includes imaging data documenting transportation activity in the environment. In various embodiments, the transportation activity is selected from the group consisting of: (a) the nature and activity of aircraft; (b) the nature and activity of automotive vehicles, and (c) the nature and activity of marine vessels.

In accordance with one embodiment, the transportation activity corresponds to the nature and behavior of marine vessels in the vicinity of a port; the machine learning model is configured to perform object detection and classification with respect to the marine vessels observed at the port; and the predictor variables include the respective types and motions of the marine vessels relative to the port.

In accordance with one embodiment, the plurality of datasets includes aerial images of the port; and the machine learning model is further configured to determine at least one of the acceleration and velocity of the marine vessels based on the aerial images.

In accordance with one embodiment, the plurality of datasets includes elevation view images of the port; and the machine learning model is further configured to determine a cargo weight for the marine vessels based on the vertical position of the vessels relative to a waterline.

In accordance with one embodiment, the transportation activity corresponds to the nature and behavior of trucking vehicles on a section of roadway; the machine learning model is configured to perform object detection and classification with respect to the trucking vehicles; and the predictor variables include the respective types and motions of the marine vessels relative to the port. In one embodiment, the data source associated with observation of the transportation activity is a publicly available traffic camera accessible via the Internet.

In accordance with one embodiment, the transportation activity corresponds to the nature and behavior of automotive vehicles parked within a parking lot adjacent a business; the machine learning model is configured to perform object detection and classification with respect to the automotive vehicles; and the predictor variables include the respective types and number of automotive vehicles detected within the parking lot over time.

In accordance with one embodiment, the first datasets include information documenting agricultural activity, e.g., selected from the group consisting of (a) time-lapse satellite images of one or more farms, (b) publicly available crop-yield data, (c) regional climate data, (d) agricultural commodity market prices, and (e) crop storage images.

In accordance with one embodiment, the predictive analytics module trains the machine learning model, selects the predictor variables, and determines the leading indicator using a generalized hypothesis generating and testing system (HGTS) and the assigned metadata.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), quantum computing, visual or image processing units, graphic processing units (GPUs), system on chips (SOCs), central processing units (CPUs), microcontroller units (MCUs), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A predictive analytics system comprising:
a plurality of datasets received from a corresponding plurality of data sources, wherein at least one of the plurality of stored datasets includes first sensor data derived from direct observation of activity within an environment, and wherein the plurality of datasets includes a set of pedestrian attributes;
a data preparation module, including a processing device, configured to assign metadata to the datasets; and
at least one of the following:
(a) a predictive analytics module, including a processing device, configured to train first and second machine learning models using the datasets as a source of predictor variables based on the assigned metadata for each of the machine learning models, and to use historical information regarding a metric of economic activity as a target variable, wherein the first and second machine learning models differ in at least one of machine learning model type and assigned metadata; and
(b) a hypothesis generating and testing system (HGTS) that trains the first and second machine learning models, selects the predictor variables for the machine learning models, and determines the leading indicator using the assigned metadata for the machine learning models; the HGTS including an analytics engine configured to: assign first and second statistical metrics to the first and second machine learning models; store the assigned metadata, the first machine learning model, and the predictor variables in a primary database in response to determining that the statistical metric assigned to the first machine learning model meets a predetermined level; and store the assigned metadata, the second machine learning model, and the predictor variables in a second, probationary database in response to determining that the second machine learning model exhibits a statistical metric does not meet a predetermined level; and select between the first and second machine learning models based on their respective statistical metric.

2. The predictive analytics system of claim 1, further comprising a publishing module configured to provide, to one or more subscribers, selected model information and output data including a leading indicator of the target variable based on the selected machine learning model and contemporaneous information received from at least one of the data sources.

3. The predictive analytics system of claim 1, wherein the set of pedestrian attributes includes (1) pedestrian movement data, (2) pedestrian appearance data, and (3) connections or correlations to other datasets that have associated information about an identified pedestrian.

4. The predictive analytics system of claim 3, wherein the pedestrian movement data includes information associated with the observed movement of individuals and groups of pedestrians in the environment.

5. The predictive analytics system of claim 4, wherein the pedestrian movement data includes at least one of: speed, gait, direction, acceleration, vertical movement, activities being performed, and hand gestures.

6. The predictive analytics system of claim 3, wherein the pedestrian appearance data includes information associated with the visual appearance of individuals and groups of pedestrians in the environment.

7. The predictive analytics system of claim 6, wherein the pedestrian appearance data includes information relating at least one of: age, gender, height, weight, facial expression, clothing, carried objects, luggage, grocery bags, backpacks, travel gear, posture, pets, and proximity to other pedestrians.

8. The predictive analytics system of claim 7, wherein the pedestrian appearance data includes a plurality of brand names associated with the carried objects.

9. The predictive analytics system of claim 3, wherein the plurality of datasets includes pedestrian experience, activity or outcome data comparing the set of pedestrian attributes prior to pedestrians entering a region-of-interest with the pedestrian attributes after leaving the region-of-interest.

10. The predictive analytics system of claim 3, wherein the set of pedestrian attributes is correlated to cash, credit card, or wireless payments made by the pedestrians that can be extracted from a correlation of video or image data, time-correlated to purchase transaction data.

11. The predictive analytics system of claim 3, wherein the set of pedestrian attributes is correlated to location services associated with the pedestrians which could either be derived from wide area network data or correlations to mobile devices using local area network information.

12. The predictive analytics system of claim 3, wherein the set of pedestrian attributes is correlated to audio content received from the pedestrians which may also include identifying characteristics of the pedestrian.

13. The predictive analytics system of claim 1, wherein the set of pedestrian attributes is correlated to location services associated with the pedestrians.

14. The predictive analytics system of claim 1, wherein the datasets are selected from the group consisting of: video or time-lapse images comprising at least one of satellite and aerial images of pedestrians in the environment.

15. The predictive analytics system of claim 1, wherein the statistical metric is based on compiling and rank-ordering data correlations for the first and second machine learning models and determining statistical significance of the data correlations.

16. The predictive analytics system of claim 1, wherein the models can be used to track historical information of pedestrians in a plurality of environments and to predict at least one of the reactions, behaviors, and business outcomes of a set or subset of the pedestrians.

17. A method for performing predictive analytics comprising:

receiving a plurality of datasets from a corresponding plurality of data sources, wherein at least one of the plurality of stored datasets includes first sensor data derived from direct observation of activity within an environment, and wherein the plurality of datasets includes a set of pedestrian attributes;

using a data preparation module, including a processing device, to assign metadata to the datasets; and performing at least one of the following:

(a) training, via a predictive analytics module including a processing device, first and second machine learning models using the datasets as a source of predictor variables based on the assigned metadata for each of the machine learning models, and to use historical information regarding a metric of economic activity as a target variable, wherein the first and second machine learning models differ in at least one of machine learning model type and assigned metadata; and (b) via a hypothesis generating and testing system (HGTS), training first and second machine learning models, selecting the predictor variables for the machine learning models, and determines the leading indicator using the assigned metadata for the machine learning models; the HGTS including an analytics engine configured to: assign first and second statistical metrics to the first and second machine learning models; store the assigned metadata, the first machine learning model, and the predictor variables in a primary database in response to determining that the statistical metric assigned to the first machine learning model meets a predetermined level; and store the assigned metadata, the second machine learning model, and the predictor variables in a second, probationary database in response to determining that the second machine learning model exhibits a statistical metric does not meet a predetermined level; and select between the first and second machine learning models based on their respective statistical metric.

18. The method of claim 17, further comprising a publishing module configured to provide, to one or more subscribers, selected model information and output data including a leading indicator of the target variable based on the selected machine learning model and contemporaneous information received from at least one of the data sources.

19. The method of claim 17, wherein the set of pedestrian attributes includes (1) pedestrian movement data, (2) pedestrian appearance data, and (3) connections or correlations to other datasets that have associated information about an identified pedestrian.

20. The method of claim 17, wherein the pedestrian movement data includes information associated with the observed movement of individuals and groups of pedestrians in the environment, and the pedestrian appearance data includes information associated with the visual appearance of individuals and groups of pedestrians in the environment.

* * * * *